United States Patent
Jones

Patent Number: 6,088,944
Date of Patent: Jul. 18, 2000

[54] SIMULATED FEEDING DECOY

[76] Inventor: Jeff Jones, Lanier Ford Shaver & Payne, P.C. P.O. Box 2087, Huntsville, Ala. 35804

[21] Appl. No.: 09/368,796

[22] Filed: Aug. 5, 1999

[51] Int. Cl.$^7$ .......................... A01M 31/06; A63H 23/10
[52] U.S. Cl. ................................... 43/3; 446/155
[58] Field of Search .............. 43/2, 3; 119/254; 446/154, 155, 159

[56] References Cited

U.S. PATENT DOCUMENTS

| | | | |
|---|---|---|---|
| 1,893,000 | 1/1933 | Ranney | 446/155 |
| 3,193,967 | 7/1965 | Okonski | 446/154 |
| 3,621,604 | 11/1971 | Danielsen et al. | 446/155 |
| 3,896,578 | 7/1975 | Franceshcini | 43/3 |
| 3,916,553 | 11/1975 | Lynch et al. | |
| 4,599,819 | 7/1986 | Voges, Jr. et al. | |
| 4,845,873 | 7/1989 | Hazlett | |
| 5,036,614 | 8/1991 | Jackson | |
| 5,207,757 | 5/1993 | Franceschini | |
| 5,385,501 | 1/1995 | Fish | 446/154 |
| 5,459,958 | 10/1995 | Reinke | |
| 5,566,491 | 10/1996 | Phillips | 43/3 |

FOREIGN PATENT DOCUMENTS 1032755  6/1978  Canada .

OTHER PUBLICATIONS

Unknow Author, "Powered Decoys Swim and Dive Around Hunter's Blind to Fool Ducks." Nov. 1954, p. 93.

*Primary Examiner*—Peter M. Poon
*Assistant Examiner*—Son T. Nguyen
*Attorney, Agent, or Firm*—Lanier Ford Shaver & Payne, P.C.; Frank M. Caprio; Gerald M. Walsh

[57] ABSTRACT

An apparatus for oscillating a flotation device on a body of water comprising attaching a rigid extension having a buoyancy container to the flotation device, placing the flotation device in the body of water such that the buoyancy container is filled with water and the flotation device and rigid extension rotate to a vertical position, and pumping gas continuously to the buoyancy container such that the buoyancy container will rise to the surface, rotating the flotation device and rigid extension to a horizontal position, thereby causing the buoyancy container to fill with water, further causing the flotation device and rigid extension to rotate to the vertical position, and to so oscillate between the vertical and horizontal positions continuously. A supply device that pumps the gas is located within the rigid extension, the buoyancy container, or the flotation device, and when the supply device is contained within the rigid extension or buoyancy container, the rigid extension plus buoyancy container can be removably attachable to any flotation device. The invention is useful for oscillating a duck decoy in the water to simulate feeding patterns, making the decoy more effective.

28 Claims, 3 Drawing Sheets

SIMULATED FEEDING DECOY

BACKGROUND OF THE INVENTION

1. Field of the Invention

The present invention relates to flotation devices, including wildlife decoys. More particularly, the present invention relates to a waterfowl decoy which simulates feeding waterfowl.

2. Description of the Prior Art

For many years hunters have realized that stationary decoys are not the best way to attract the attention of waterfowl. In order to increase the attractiveness of a decoy system in attracting ducks, hunters and wildlife enthusiasts have utilized a number of mechanisms and motion decoys to attract the attention of waterfowl. Because live ducks are normally not stationary, any increased movement by waterfowl decoys increases the hunter's chance in attracting additional waterfowl. A number of motion-creating decoys are presently in use.

One such decoy is commonly known as a "swimmer." The swimmer decoy is a standard duck decoy with a specialized propeller on the underside of the decoy housing. The decoy is anchored to the bottom of the lake with a sufficient amount of slack in the anchor line. The propeller creates a circular swimming motion. The swimming motion simulates the action of a live duck.

An additional decoy currently used is commonly referred to as a "feeder." A feeder decoy simulates a duck partially submerged and feeding on the bottom of the lake. The decoy consists only of the latter half of the decoy housing and the tail end of the decoy protrudes from the water so that it appears that the duck is feeding on vegetation under the water's surface. This decoy often includes a means for vibrating the feeder decoy such that ripples form around the decoy portion extending out of the water. The feeder decoy is not a replication of the entire duck, rather only the tail end of the duck is molded.

Another type of motion decoy presently on the market is often referred to as a "wobbler." This decoy is similar to the "feeder" decoy in that a vibrating means is attached to the decoy. However, in contrast to a "feeder" decoy, a wobbler decoy consists of a standard decoy housing. The vibrating means in the decoy housing causes ripples to form around the decoy. These ripples simulate the ripples caused by motion from a live duck.

Some decoys simulate motion by using air. One such decoy is disclosed in U.S. Pat. No. 5,566,491, entitled "Method and Apparatus for Animating a Floating Waterfowl Decoy." In one embodiment of that invention air is forced through a plastic tube and the air is released underneath the floating decoy. The bubbles create rings and waves around the decoy and simulate movement.

Decoys may also simulate the movements of live waterfowl by mechanical manipulation by a hunter. In one embodiment, a standard decoy is anchored to the bottom of a lake or stream. A drawstring is attached to the underside of the front end of the decoy, threaded through the anchor and held by the hunter in a blind or in a boat. When the hunter pulls the drawstring, the front end of the decoy is forced into the water and the back end of the decoy is lifted into the air. This method often results in tangled drawstrings and requires excessive movement by the hunter. This movement is often detected by waterfowl and scares them away.

Additional decoys simulate live waterfowl by including wing movement. Some decoys simulate the wing movement while resting on the water surface while other decoys simulate waterfowl in flight. The latter decoys normally include some support to elevate the decoy off of the water surface.

None of the automated motion decoys on the market combine simulated feeding activity with the standard, full-size floating decoy housing. Thus, there is a need for a full-size floating decoy which can simulate the feeding activity of a waterfowl, without requiring manual manipulation by the hunter.

SUMMARY OF THE INVENTION

The present invention relates generally to an apparatus for oscillating a flotation device in a body of water and in particular to a waterfowl decoy which simulates the feeding motion of a waterfowl by periodically tipping one end of the decoy beneath the water surface. The decoy essentially consists of a standard decoy housing comprising a means for oscillating the decoy housing. The oscillation means has a rigid extension which extends outward from the flotation device, and at the end of the extension is a container which is periodically filled with air by an air pump. The operation of the air pump, and subsequent air inflation of the container cause the counterbalanced decoy to become upright in the water and replicate the appearance of other normal decoys. As the decoy becomes upright in the water, the container releases the air from within the container and fills with water causing the front end of the decoy to tip back into the water.

One object of the present invention is to provide an apparatus for oscillating a flotation device in a body of water.

Another object of the present invention is to provide a duck decoy simulating the feeding patterns of a live duck by using the buoyancy effect of a container intermittently filed with air to tip the decoy in and out of the water.

Another object of the invention is to provide a duck decoy with a container with a large opening such that the air held in the container is released quickly.

Another object of the invention is to provide a duck decoy with a container with a small opening such that the air held in the container is released slowly.

Another object of the invention is to provide a duck decoy that simulates the feeding patterns of a live duck by using a battery-powered air pump to fill a container at the end of a rigid extension protruding from the decoy housing.

Another object of the invention is to provide a duck decoy that simulates the feeding patterns of a live duck which contains a skirt to channel the bubbles from the release of air from the container underneath the decoy, simulating movement.

Yet another object of the invention is to provide a removably attachable means for oscillating any flotation device, such that the oscillation means may be removably attached to different flotation devices and provide oscillation to each such device.

DETAILED DESCRIPTION OF THE PREFERRED EMBODIMENTS

Figure 1:
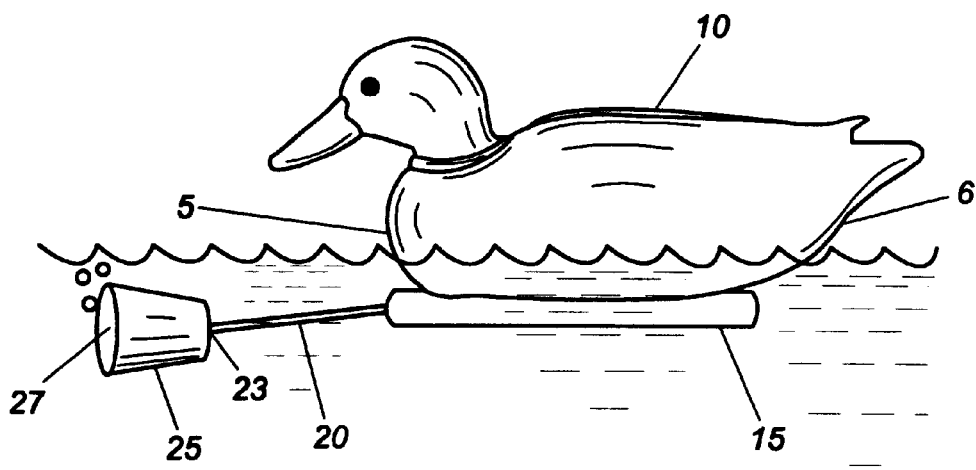
FIG. 1 shows one embodiment of the invention with a container having a large opening on the end of the rigid support for quick release of the air in the container.
Figure 2:
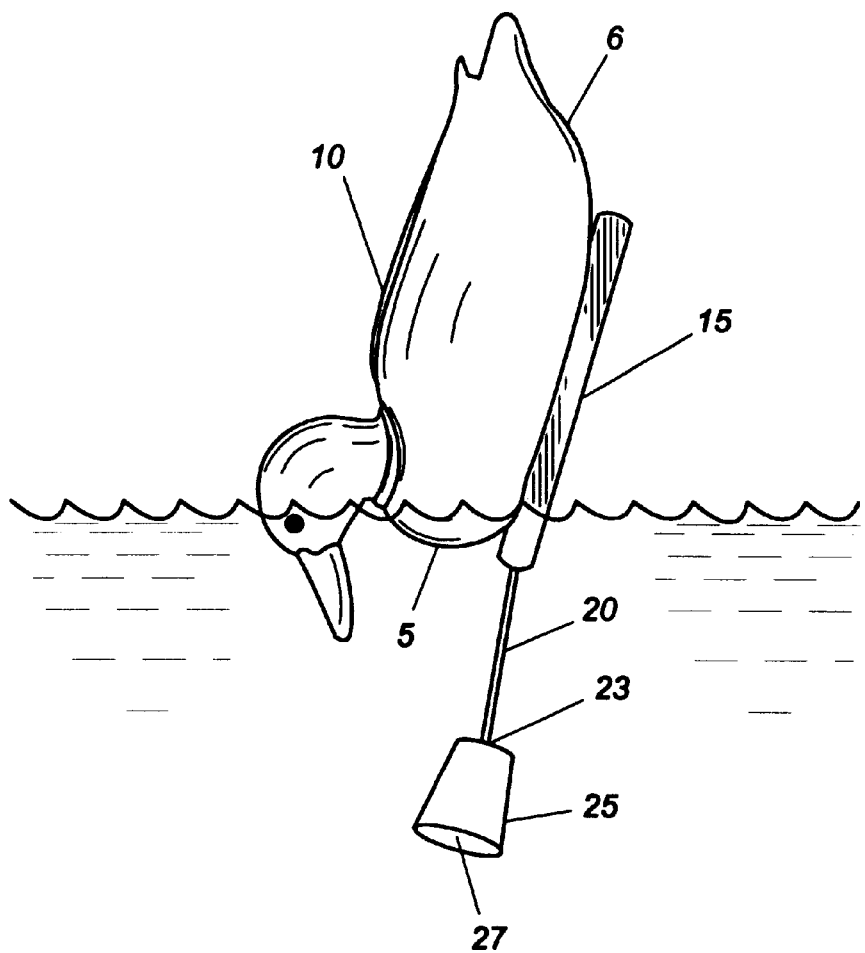
FIG. 2 shows one embodiment of the present invention in which the decoy is in the vertical position after the air in the container has been replaced with water.

FIG. 1 shows an embodiment of the invention which employs a flotation device such as a standard decoy housing 10, and a means for oscillating the flotation device in a body of water. FIG. 1 shows decoy housing 10 having a first end 5, a second end 6, and a keel 15, sitting in a body of water horizontally. Decoy housing 10 is modified such that a rigid extension 20 extends outward from first end 5 terminating in opposite end 23. A proximal end of rigid extension 20 may be removably attached to first end 5 of decoy housing 10 such that rigid extension 20 will be under the water's surface when in use. At opposite end 23 of rigid extension 20 is attached buoyancy container 25 with an opening 27. When container 25 is filled with air, decoy housing 10 sits horizontally in the water. However, in this position water will displace the air in container 25 through opening 27. Rigid extension 20 and container 25 are counterbalanced such that when container 25 is filled with water, it will descend into the water and first end 5 of decoy housing 10 will tip into the water leaving second end 6 of decoy housing 10 extending upward into the air as shown in FIG. 2. At the same time a means for adding air to container 25 will begin to displace the water from container 25 with air when decoy housing 10 is in this vertical position and will increase the buoyancy of container 25. As the container 25 fills with air, it rises towards the surface of the water such that first end 5 will tip out of the water and decoy housing 10 will resume the horizontal position shown in FIG. 1. The means for adding air to container 25 can do so continuously so that first end 5 will tip into or out of the water as container 25 is filled with water or air, respectively. Thus, a continuous air flow to container 25 will produce an oscillation or rocking motion which simulates feeding. The frequency of this rocking will depend on the air flow rate and the degree and nature of counterbalancing between container 25 plus rigid extension 20, on the one hand, and decoy housing 10 plus keel 15, on the other hand.

Figure 3:
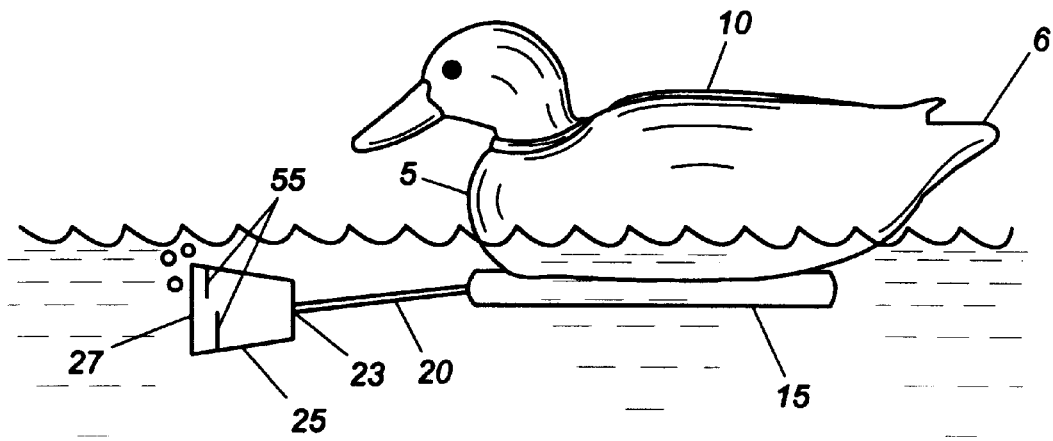
FIG. 3 shows another embodiment of the invention with a container with baffles on the end of the rigid extension for intermediate release of the air in the container.
Figure 4:
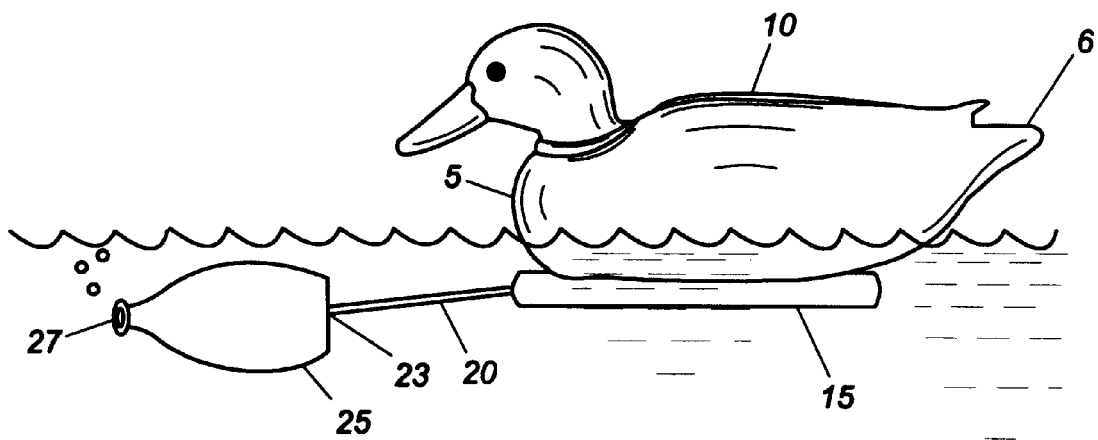
FIG. 4 shows another embodiment of the invention with a container with a small opening on the end of the rigid extension for the slow release of the air in the container.

The frequency of the rocking can also be regulated by the rate at which water can displace air when decoy housing 10 is in the horizontal position. For a relatively fast rocking motion, container 25 would have a relatively wide opening so that water and air could move freely into and out of container 25 as shown in FIGS. 1 and 2, respectively. FIG. 3 shows another embodiment where baffles 55 in container 25 create resistance to the flow of water into container 25 and thereby produces relatively moderate rate of rocking motion. Likewise, a small mouth container 25 shown in FIG. 4, would create further resistance to the flow of water into container 25, thereby producing a relatively slow rocking motion. The rocking motion of the decoy, along with the resulting rippling of the water, will attract birds. The air escaping from container 25 increases the rippling effect of the water.

Figure 5:
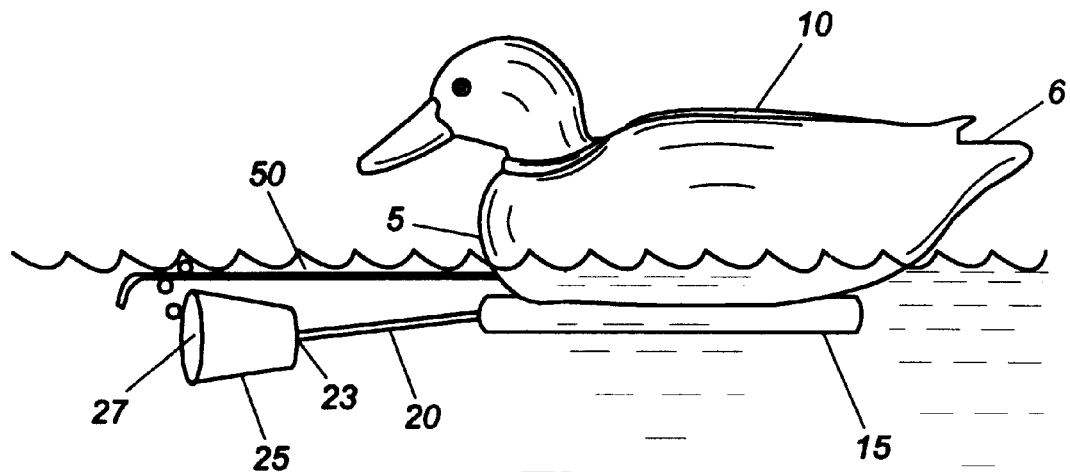
FIG. 5 shows another embodiment of the invention with a skirt above the rigid extension and container for channeling the air bubbles.

In the embodiments of the present invention shown in FIGS. 1 through 4, air bubbles will surface through the water at the first end 5 of decoy housing 10. FIG. 5 shows another embodiment where skirt 50 attached to first end 5 above rigid extension 20 and container 25 channels air bubbles under decoy housing 10.

Figure 6:
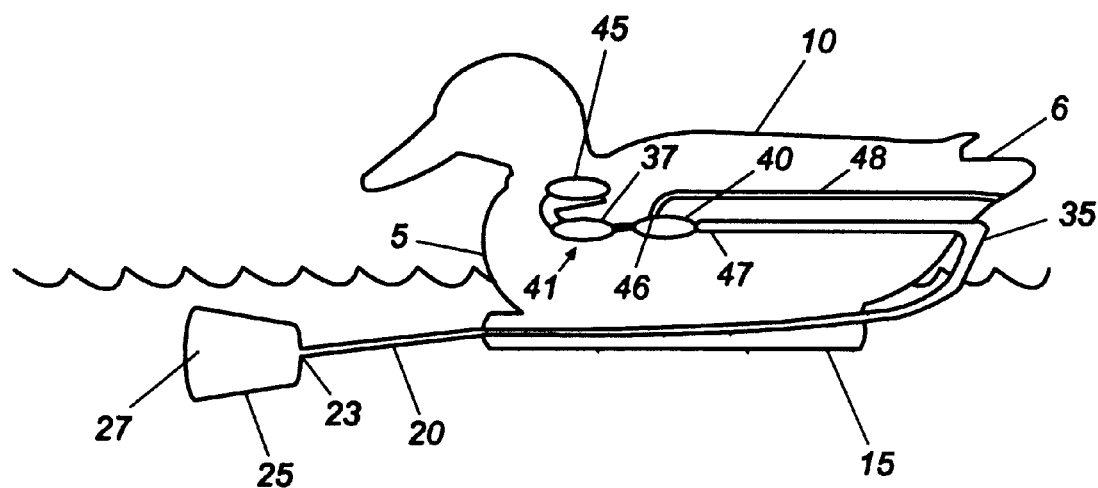
FIG. 6 shows a crossectional view of the decoy housing, rigid extension, and container, illustrating means for adding air to the container.

FIG. 6 shows a crossectional view of decoy housing 10, rigid extension 20, and buoyancy container 25, illustrating a gas supply device 41 for adding air to container 25. A preferred embodiment of supply device 41 includes motor 37 activated by power source 45, preferably batteries, where said motor 37 activates air pump 40 to pump air through air line 35 to container 25. Air line or tubular member 35 is connected to pump 40 at output 47 and can exit decoy housing through second end 6, pass through keel 15, and through rigid extension 20, attaching to container 25. Air pump 40 has a gas intake 46 to which air intake tube 48 is connected and extends to second end 6 where it exits.

Alternatively, air line 35 can connect directly to container 25 external of keel 15 and rigid support 20. Air line 35 can also exit from the internal portion of decoy housing 10 through keel 15 or rigid support 20.

Also, the supply device 41 can be contained entirely within rigid extension 20 or buoyancy container 25, where intake tube 48 can exit rigid extension 20 or container 25 in any convenient manner and be attached anywhere conveniently on the decoy housing. Likewise, tubular member 35 can extend from pump 40 to container 25. In this manner, the rigid extension 20 with container 25 can be removably attachable to any flotation device or duck decoy.

A preferred embodiment of pump 40 is a small battery-operated air pump, such as a bait-bucket aerator pump, wherein power source 45 contains "D"-cell batteries. Motor 37 can drive pump 40 for several hours with one or more "D"-cell batteries. Power source 45, motor 37, and pump 40 may be constructed as a single unit and may be positioned internally in decoy housing 10 or external to decoy housing 10. An on/off switch may be employed directly or as a remote activation source. A valve may be positioned in air line 35 to prevent water leaking back towards pump 40 and motor 37. Alternatively, air line 35 may be positioned above the water line to act as an inverted "u" trap having a submerged portion and an unsubmerged portion, so that water cannot leak through the submerged portion to the unsubmerged portion. The submerged portion may be adjoined to the buoyancy container and the unsubmerged portion may be joined to the output of the pump.

Any small battery operated air pump can be used in the present invention and any decoy can be modified for use. Air line material can employ various plastics or metals. Several of the components can be integrated for ease of manufacturing. Although air pump 40 and power source 45 are preferably housed internally, they can be external in rigid support 20 or in container 25 as part of the counterbalance, or under decoy housing 10. Container 25 can be a variety of shapes.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the length of rigid support 10 may vary and the weight of container 25 may vary. The counterbalance effect of container 25 may be achieved by placing the battery in container 25. The exit point of air line 35 from the flotation device can be above or below the waterline and from any portion of decoy housing 10. The flotation device can be made of various materials including plastic, wood, or rubber. The invention can be made to operate manually with a manual pump and air line extending from the flotation device to the user. The means for adding air to the container could include a small tank of compressed gas using other gases in addition to air. The invention may be adapted to oscillate any flotation device in a body of water.

It will be understood that various changes in the details, materials, and arrangements of the parts which have been described and illustrated above in order to explain the nature of this invention may be made by those skilled in the art without departing from the principle and scope of the invention as recited in the following claims.

What I claim is:

1. An apparatus for oscillating a flotation device in a body of water, comprising:
   a) said flotation device having a first end and a second end;
   b) a means for oscillating the flotation device comprising a rigid extension having a proximal end and an opposite end, wherein said proximal end is removably attached to said first end of the flotation device and said opposite end is adjoined to a buoyancy container having an opening; and
   c) a means for supplying a gas to said buoyancy container.

2. The apparatus of claim 1 wherein, when said rigid extension is attached to said flotation device and said flotation device is placed horizontally on the body of water, said buoyancy container fills with water through said opening, thereby rotating the first end of the flotation device towards a vertical position into the body of water, such that said gas supply means fills said buoyancy container with gas, causing the first end of the flotation device to rotate back towards the horizontal position so that said buoyancy container refills with water and continuously rotates between the horizontal position and the vertical position, thereby oscillating said flotation device on the body of water.

3. The apparatus of claim 1 wherein said gas supply means is located within the oscillation means, such that the oscillation means may be removably attached to different flotation devices and provide oscillation to each such device.

4. The apparatus of claim 3 wherein said flotation device is a decoy housing for simulating feeding patterns of aquatic wildlife as said decoy housing oscillates in the body of water.

5. The apparatus of claim 1 wherein said gas supply means comprises a gas pump having a gas intake and an output, a motor, and a power source, such that when said motor is activated by said power source, gas is supplied into said buoyancy container by said gas pump.

6. The apparatus of claim 5 wherein said power source is a battery.

7. The apparatus of claim 5 wherein said motor may be turned on and off by a remote activation source.

8. The apparatus of claim 5 wherein the second end of said flotation device is situated above the body of water prior to and throughout the oscillation of the flotation device and has an air opening for the gas intake of the pump.

9. The apparatus of claim 8 further comprising an air intake tube connected between said air opening and gas intake of said gas supply means.

10. The apparatus of claim 5 further comprising a member for carrying gas from said output of said pump to said buoyancy container, wherein said member has a supply end coupled to said gas supply means and a container end coupled to said buoyancy container.

11. The apparatus of claim 10, wherein said member carries the gas from said gas supply means to said buoyancy container by way of said rigid extension.

12. The apparatus of claim 10, wherein said member further comprises a means for preventing water from leaking back through said tubular member to said gas supply means.

13. The apparatus of claim 12, wherein said prevention means is a valve within said member.

14. The apparatus of claim 12, wherein said prevention means is an inverted "u" trap, having a submerged portion and an unsubmerged portion, positioned so that water cannot leak through said submerged portion to said unsubmerged portion, wherein said submerged portion is adjoined to said buoyancy container and said unsubmerged portion is adjoined to the output of said pump.

15. The apparatus of claim 10 wherein said flotation device has a keel.

16. The apparatus of claim 15 wherein said proximal end of said rigid extension is capable of being removably attached to said keel, such that said keel is capable of providing a medium of intersection of said rigid extension and said member for transmitting gas to said buoyancy container, wherein said member is connected between said proximal end and said gas supply means.

17. The apparatus of claim 1 wherein said buoyancy container further comprises a weight for counterbalancing said oscillation means with said flotation device.

18. The apparatus of claim 1 further comprising a means for controlling a rate of oscillation of said flotation device between the horizontal position and the vertical position.

19. The apparatus of claim 18 wherein said controlling means has a pre-sized opening in said buoyancy container.

20. The apparatus of claim 18 wherein said buoyancy container further comprises one or more baffles to create resistance to a flow of water into said buoyancy container, thereby controlling the rate of oscillation of said flotation device between the horizontal position and the vertical position.

21. The apparatus of claim 1 wherein said flotation device has a skirt to deflect bubbles caused by gas produced by said gas supply device.

22. An apparatus for simulating feeding patterns of aquatic wildlife in a body of water, comprising:
   a) an aquatic wildlife decoy housing having a first end and a second end;
   b) an oscillation means comprising a rigid extension having a proximal end adjoined to the first end of said decoy housing and an opposite end projecting outward from the first end of said decoy housing, wherein said opposite end is adjoined to a buoyancy container having an opening, said rigid extension and said buoyancy container being counterbalanced with said decoy housing so that when said decoy housing is positioned on the body of water said buoyancy container fills with water through the opening and descends into the body of water, thereby oscillating the first end of said decoy housing towards a vertical position in the body of water;
   c) a means for supplying gas to said buoyancy container, wherein said gas supply means has a pump with a gas intake and an output, said gas supply means designed such that when the decoy housing has oscillated into the vertical position, the gas supply means fills said buoyancy container with gas causing said decoy housing to rotate back towards a horizontal position so that said buoyancy container refills with water and continuously oscillates the decoy housing between a horizontal position and a vertical position, thereby simulating feeding patters of aquatic wildlife;

d) a member for carrying gas from said gas supply means to said buoyancy container, wherein said member has a supply end coupled to the output of said supply device and a container end coupled to said buoyancy container; and wherein said buoyancy container has a pre-sized opening and one or more baffles for controlling a rate of water flow into said buoyancy container, thereby controlling the rate of oscillation of said flotation device between a horizontal position and a vertical position.

23. An apparatus for simulating feeding patterns of aquatic wildlife in a body of water, comprising:

a) an aquatic wildlife decoy housing having a first end, a second end situated above the body of water prior to and throughout the simulating of feeding patterns, a lower portion having a keel, a skirt positioned on said first end to deflect bubbles, and a means for supplying a gas, wherein said gas supply means has a gas pump having an output, a gas intake, a gas intake tube connected to said gas intake and to said second end, and a motor powered by a battery and activated by a switch;

b) a means for oscillating the decoy housing comprising a rigid extension having a proximal end adjoined to said keel under the first end of said decoy housing and an opposite end adjoined to a buoyancy container having an opening and positioned below said skirt, wherein said buoyancy container has a pre-sized opening for controlling the rate of water flow into said buoyancy container, thereby controlling the rate of rotation of said flotation device between a horizontal position and a vertical position, one or more baffles to create resistance to the flow of water into said buoyancy container, and a weight for counterbalancing said rigid extension and said buoyancy container with said decoy housing, such that, when said decoy housing is placed in the horizontal position on the body of water, said buoyancy container fills with water through said opening and descends into the body of water, thereby rotating the first end of said decoy housing towards the vertical position; and c) a member traversing through said rigid extension for carrying gas from said gas supply means to said buoyancy container, wherein said member has a supply end coupled to the output of said pump, a container end coupled to said buoyancy container, a valve, and an inverted "u" trap, wherein said valve and said inverted "u" trap prevent water from leaking back towards said supply device;

wherein, when said decoy housing is placed in the horizontal position on the body of water, said buoyancy container fills with water through said opening, thereby rotating said decoy housing towards the vertical position into the body of water such that said gas supply means fills said buoyancy container with gas causing said decoy housing to rotate back towards the horizontal position so that said buoyancy container refills with water and continuously oscillates between the horizontal position and the vertical position, thereby simulating feeding patterns of aquatic wildlife.

24. A method for oscillating a flotation device on a body of water comprising the steps of:

a) attaching to the flotation device a means for oscillating the flotation device, said oscillating means comprising a rigid extension having a buoyancy container;

b) placing the flotation device in the body of water such that the buoyancy container is filled with water and the flotation device and rigid extension rotate to a vertical position; and c) pumping gas continuously to the buoyancy container such that the buoyancy container will rise to the surface, rotating the flotation device and rigid extension to a horizontal position, thereby causing the buoyancy container to fill with water, further causing the flotation device and rigid extension to rotate to the vertical position, and to so oscillate between the vertical and horizontal positions continuously.

25. A method as recited in claim 24, where the step of pumping gas is produced by a means for supplying gas located within the oscillating means, such that the oscillation means may be removably attached to different flotation devices and provide oscillation to each such device.

26. A method as recited in claim 25 further comprising the step of deflecting bubbles caused by the gas supply means.

27. A method as recited in claim 24 further comprising the step of controlling a rate of rotation of the flotation device between the horizontal position and the vertical position by controlling the rate at which the buoyancy container fills with water.

28. A method as recited in claim 24, whereby said oscillating simulates feeding patterns of aquatic wildlife.

* * * * *